United States Patent
Ashikhmin et al.

(10) Patent No.: US 8,300,518 B2
(45) Date of Patent: Oct. 30, 2012

(54) FAST SEAMLESS JOINING OF CHANNELS IN A MULTI-CHANNEL COMMUNICATION SYSTEM

(75) Inventors: Alexei Ashikhmin, Morristown, NJ (US); Adriaan J. De Lind Van Wijngaarden, New Providence, NJ (US); Gerhard Guenter Theodor Kramer, Chatham, NJ (US); Carl Jeremy Nuzman, Union, NJ (US); Philip Alfred Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 558 days.

(21) Appl. No.: 12/060,653

(22) Filed: Apr. 1, 2008

(65) Prior Publication Data

US 2009/0245081 A1    Oct. 1, 2009

(51) Int. Cl.
*H04J 3/10* (2006.01)
(52) U.S. Cl. ........................................ 370/201
(58) Field of Classification Search .................. 370/201, 370/420, 431
See application file for complete search history.

(56) References Cited

U.S. PATENT DOCUMENTS

| | | | | |
|---|---|---|---|---|
| 5,991,308 | A * | 11/1999 | Fuhrmann et al. | 370/395.53 |
| 6,263,011 | B1 * | 7/2001 | Paik et al. | 375/149 |
| 6,463,528 | B1 * | 10/2002 | Rajakarunanayake et al. | 713/1 |
| 6,693,992 | B2 | 2/2004 | Jones et al. | |
| 6,731,675 | B2 * | 5/2004 | Nohara et al. | 375/147 |
| 6,778,596 | B1 * | 8/2004 | Tzannes | 375/222 |
| 6,829,293 | B2 | 12/2004 | Jones et al. | |
| 6,870,901 | B1 | 3/2005 | Gudmundsson et al. | |
| 6,937,613 | B1 | 8/2005 | Bedrosian | |
| 6,954,800 | B2 * | 10/2005 | Mallory | 709/240 |
| 6,985,521 | B1 | 1/2006 | Rezvani et al. | |
| 7,176,721 | B2 * | 2/2007 | Ho et al. | 326/82 |
| 7,356,049 | B1 * | 4/2008 | Rezvani | 370/484 |
| 7,406,042 | B1 * | 7/2008 | Shridhar et al. | 370/230 |
| 2002/0001355 | A1 * | 1/2002 | Tore | 375/350 |
| 2002/0080516 | A1 * | 6/2002 | Bhakta et al. | 360/77.02 |

(Continued)

FOREIGN PATENT DOCUMENTS

WO    WO99/14921    3/1999

(Continued)

OTHER PUBLICATIONS

X. Hou et al., "A Time-Domain Approach for Channel Estimation in MIMO-OFDM-Based Wireless Networks," IEICE Trans. Commun., Jan. 2005, pp. 3-9, vol. E88-B, No. 1.

(Continued)

*Primary Examiner* — Anh-Vu Ly
*Assistant Examiner* — Mohammad Anwar
(74) *Attorney, Agent, or Firm* — Ryan, Mason & Lewis, LLP (57) ABSTRACT

At least one channel is joined to a group of active channels in a communication system by transmitting control signals to configure respective customer premises equipment (CPE) of the active channels into a joining mode of operation, and transmitting a joining signature sequence to CPE of the joining channel over a downstream data signal path of the joining channel. A central office (CO) or other access node of the system receives correlation results from respective active channel CPE, estimates crosstalk from the joining channel into the active channels based on the correlation results, configures a precoder based on the estimated crosstalk, and adds the joining channel to the group of active channels. The channels may comprise respective subscriber lines of a DSL communication system.

20 Claims, 4 Drawing Sheets

U.S. PATENT DOCUMENTS

2006/0281414 A1* 12/2006 Lindoff et al. ............. 455/67.11
2008/0247446 A1* 10/2008 Kramer et al. ................ 375/222
2009/0175156 A1* 7/2009 Xu ................................ 370/201

FOREIGN PATENT DOCUMENTS

WO PCT/US2009/038030 7/2009

OTHER PUBLICATIONS

P.V. Kumar et al., "Large Families of Quaternary Sequences with Low Correlation," Proceedings, 1994 IEEE International Symposium on Information Theory, 1994, p. 71.

F. Jessie MacWilliams et al., "Pseudo-Random Sequences and Arrays," Proceedings of the IEEE, Dec. 1976, pp. 1715-1729, vol. 64, No. 12.

ITU Recommendation, COM 15-C 177-E, "G.vds12: Pilot Sequence Assisted Vector Channel Estimation," Study Group 15—Contribution 177, Upzide Labs, pp. 1-6, Oct. 2006.

ITU Recommendation, COM 15-C 685-E, "G.vector: Advantages of Using a Startup Sequence for Joining Event," Study Group 15—Contribution 685, Infineon Technologies North American, pp. 1-3, Jan. 2008.

* cited by examiner

M = 3 LINES EACH ASSIGNED A SEQUENCE OF LENGTH L = M+1.

ESTIMATE ALL XTALK BETWEEN ALL LINES.

FAST SEAMLESS JOINING OF CHANNELS IN A MULTI-CHANNEL COMMUNICATION SYSTEM

FIELD OF THE INVENTION

The present invention relates generally to communication systems, and more particularly to techniques for controlling crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder.

One known approach to estimating crosstalk coefficients for downstream crosstalk cancellation in a DSL system utilizes error feedback from customer premises equipment (CPE) to a central office (CO) of the system. In such arrangements, synchronization groups may be formed, comprising multiple active lines that are synchronized with one another at a DMT symbol level. Such synchronization simplifies the operation of the precoder and increases its effectiveness.

SUMMARY OF THE INVENTION

It is often desirable to "join" an additional line to a group of active lines in a DSL system. For example, it may become necessary to activate one or more inactive lines in a synchronization group that already includes multiple active lines. In order to prevent undue interference from the joining line into the active lines, the crosstalk from the joining line into the active line should be estimated and the precoder adjusted accordingly.

The present invention in one or more illustrative embodiments provides techniques for joining one or more additional channels to a given set of one or more active channels in a multi-channel communication system. The channels may be, for example, subscriber lines of a DSL system, or other types of channels in other wired or wireless systems.

In accordance with one aspect of the invention, at least one channel is joined to a group of active channels in a communication system by transmitting control signals to configure respective CPE of the active channels into a joining mode of operation, and transmitting a joining signature sequence to CPE of the joining channel over a downstream data signal path of the joining channel. A CO or other access node of the system receives correlation results from respective active channel CPE, estimates crosstalk from the joining channel into the active channels based on the correlation results, configures a precoder based on the estimated crosstalk, and adds the joining channel to the group of active channels.

In an illustrative embodiment, a given one of the correlation results is generated in a corresponding one of the active channel CPE by correlating an error signal generated from a received downstream data signal with a copy of the joining signature sequence as generated in that CPE.

In accordance with another aspect of the invention, the CPE of a given channel of the multi-channel communication system is configurable for operation in at least a joining mode of operation and a tracking mode of operation, responsive to at least one control signal received from the CO or other access node of the system. In the joining mode of operation, the CPE is configured to generate at least one correlation result and to send the correlation result to the access node, and in the tracking mode of operation the CPE is configured to generate at least one error sample and to send the error sample to the access node.

Advantageously, the illustrative embodiments provide fast, seamless joining of one or more additional channels to a given set of active channels. The described techniques allow the precoder to adapt rapidly to the joining channel or channels, thereby limiting the adverse impact of the joining channel(s) on the existing active channels. The techniques can be implemented without significantly increasing the complexity of the CPE.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for joining subscriber lines or other communication channels to a group of active channels in such systems. It should be understood, however, that the invention is not limited to use with the particular types of communication systems or joining techniques disclosed. The invention can be implemented in a wide variety of other communication systems, and in numerous alternative applications involving one or more channels joining a group of active channels. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc.

Figure 1:
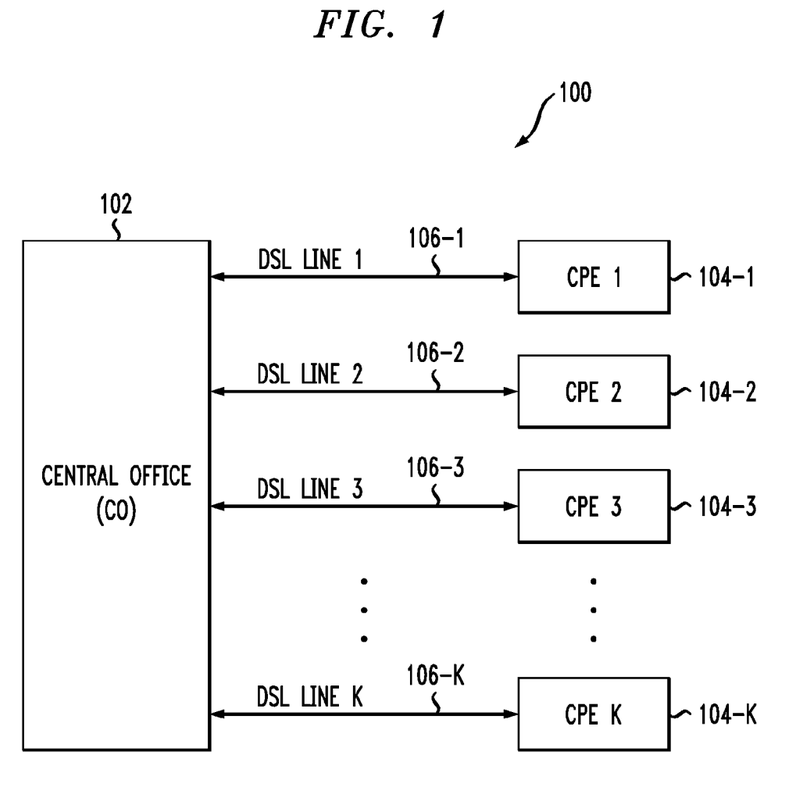
FIG. 1 is a block diagram of a multi-channel communication system in an illustrative embodiment of the invention.

FIG. 1 shows a communication system 100 comprising a central office (CO) 102 and customer premises equipment (CPE) 104. The CPE 104 more particularly comprises K distinct CPE elements that are individually denoted CPE 1, CPE 2, . . . CPE K, and are further identified by respective reference numerals 104-1, 104-2, . . . 104-K as shown. A given CPE element may comprise, by way of example, a modem, a computer, or other type of communication device, or combinations of such devices. The CO 102 is coupled to these CPE elements via respective subscriber lines denoted Line 1, Line 2, . . . Line K, each of which may comprise, for example, a twisted-pair copper wire connection.

In an illustrative embodiment, fewer than all of the K lines 106-1 through 106-K are initially active lines, and at least one of the K lines is a "joining line" that is to be activated and joined to an existing group of active lines. The initially active lines are an example of what is referred to herein as a "group" of active lines. Such a group may be, for example, a synchronization group, which may also be referred to as a preceding group, or any other type of grouping of active lines.

Communications between the CO 102 and the CPE 104 include both downstream and upstream communications for each of the active lines. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and such techniques will not be described in detail herein.

The CO 102 may be viewed as an example of what is more generally referred to herein as an "access node" of a communication system. Another example of a possible access node as that term is used herein is a DSL access multiplexer (DSLAM).

The terms "customer premises equipment" or CPE should be construed generally as including other types of user equipment in the context of non-DSL systems.

Figure 2:
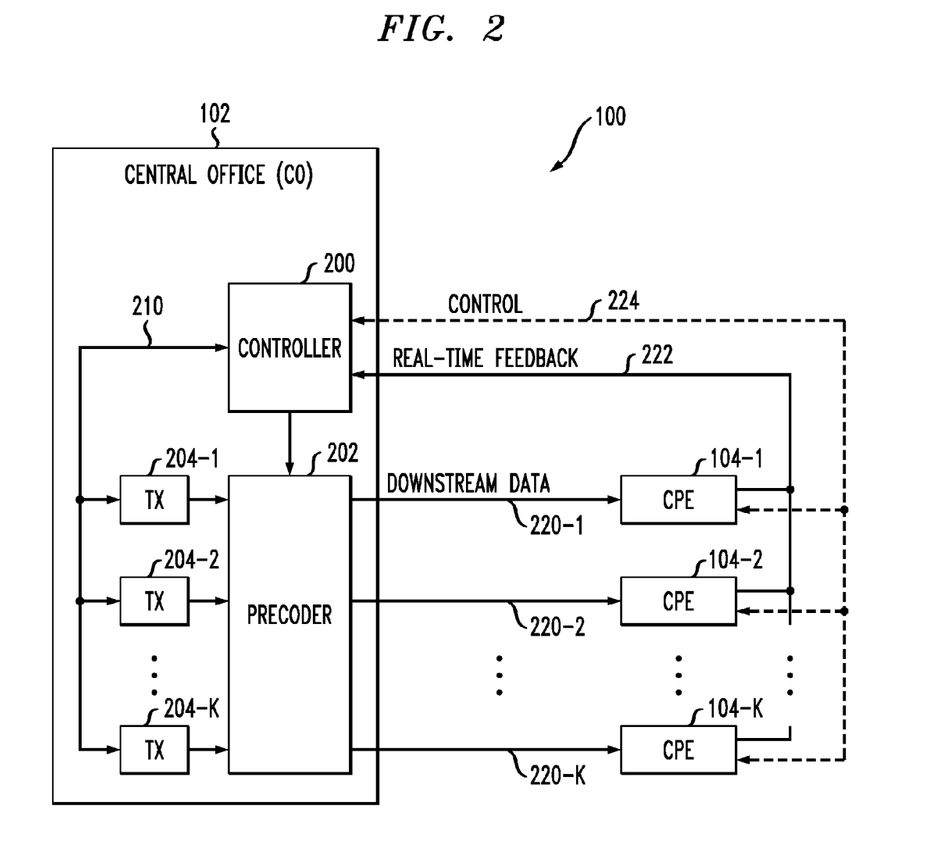
FIG. 2 shows a more detailed view of one possible implementation of the FIG. 1 system.

Referring now to FIG. 2, the central office 102 is shown in this particular implementation as including a controller 200, a precoder 202, and a set of K transmitters denoted 204-1 through 204-K. The controller is coupled to the precoder and the transmitters for controlling the transmission of downstream signals in system 100. The transmitters generate respective streams of DMT symbols that are transmitted over downstream data paths 220-1 through 220-K to respective CPE 104-1 through 104-K. The precoder 202 utilizes crosstalk estimates to adjust the downstream signals prior to transmission in a manner that tends to cancel out the crosstalk introduced in traversing the downstream data paths.

The downstream data paths 220 shown in FIG. 2 represent downstream signal paths of the respective DSL lines 106 shown in FIG. 1. The system 100 also includes real-time feedback signal paths 222, which may be upstream signal paths of respective active ones of the DSL lines 106 shown in FIG. 1. It should be noted that a joining line does not have such a real-time feedback signal path until such time as the line is joined to the group and becomes active. The controller 200 supplies control signals to the CPE via control signal paths 224, which may represent, for example, one or more designated and otherwise conventional control channels within the DSL lines 106.

In accordance with an aspect of the invention, each of the CPE 104 is configurable into multiple modes of operation responsive to control signals supplied by the CO 102 over control signal paths 224. One such mode of operation is referred to herein as a joining mode of operation. When a given line is to be joined to a group of active lines, the CO 102 transmits control signals to configure respective CPE of the active lines into the joining mode of operation. The CO also transmits a joining signature sequence to CPE of the joining line over the downstream data signal path 220-i, i=1, 2, . . . or K, of the joining line. The index i in this context and elsewhere herein will denote a particular joining line. The joining line CPE need not be configured into its joining mode of operation, as a real-time feedback path from this CPE to the CO is not present until the line becomes active.

The active line CPE in the joining mode of operation perform correlation operations on error signals generated from their respective received downstream data signals and send the correlation results back to the CO over the real-time feedback signal paths 222. A given one of these correlation results is generated in a corresponding one of the active line CPE by correlating an error signal that is generated as the difference between the received downstream data signal and an estimated transmitted data signal with a copy of the joining signature sequence as generated in that CPE. This process will be described in greater detail below with reference to the CPE circuitry shown in FIG. 3. The controller 200 receives the correlation results from the respective active line CPE and estimates crosstalk from the joining line into the active lines based on the correlation results. The precoder 202 is then configured based on the estimated crosstalk, and the joining line is added to the group of active lines.

The controller 200 then configures the active channel CPE, which now includes the above-noted joining channel CPE, into what is referred to herein as a tracking mode of operation. In the tracking mode of operation, the active channel CPE do not perform correlations as in the joining mode, but instead generate periodic error samples which are returned to the controller via the real-time feedback signal paths 222. The error samples are based on tracking signature sequences transmitted by the CO over the downstream data paths in synchronization symbol positions of multiple frames. Correlation operations based on the error samples provided by the active line CPE are performed by the controller 200. The correlation results are processed in the controller to generate crosstalk estimates that are used to configure the precoder 202.

The CO 102 should be able to determine which correlation results are from which frame in joining mode and which error samples are from which synchronization symbol positions in tracking mode. This may be achieved, for example, by configuring the real-time feedback signal paths 222 from the CPE 104 to carry synchronous streams. However, synchronous feedback paths are not required, and other known techniques may be used to associate the correlation results and error samples with particular frames. A given frame may be, for example, a DMT superframe as defined in the VDSL2 standard, although the present invention does not require the use of any particular framing arrangement.

The joining signature sequence may be a single signature sequence shared by all of the CPE 104. Thus, any line that is joining a group of active lines may use the same joining signature sequence regardless of which line is joining. The tracking signature sequences are typically unique to the respective active lines. As will be described in greater detail below, these sequences may be viewed as using the values 1 and −1, although other types of sequences could be used. Signature sequences referred to herein may incorporate aspects of conventional pilot sequences.

A given signature sequence may be implemented by sending a complex constellation point, say x, modulated by a sequence consisting of the values 1 and −1. The resulting complex sequence then consists of points x and −x. An example would be x=1+j. Regardless of the value of x used, the correlation sequence need only consist of the values 1 and −1. Generally, one may use any sequence and any constellation. Although only two points are used in the previous example, this is by way of example and alternative embodiments may use different numbers of points.

The control signals from the CO to the CPE which configure the CPE in either the joining mode or the tracking mode may be sent using an existing, otherwise conventional DSL control channel, as it is not necessary switch back and forth between modes rapidly. The CO may send a request to the CPE over this control channel to switch from one mode to another, and may receive an acknowledgement from the CPE that this switching has taken place. An example of a suitable control channel is the embedded operations channel (EOC) of the above-noted VDSL2 standard. Information sent over this channel is generally encapsulated and sent over downstream and upstream signal paths.

Figure 3:
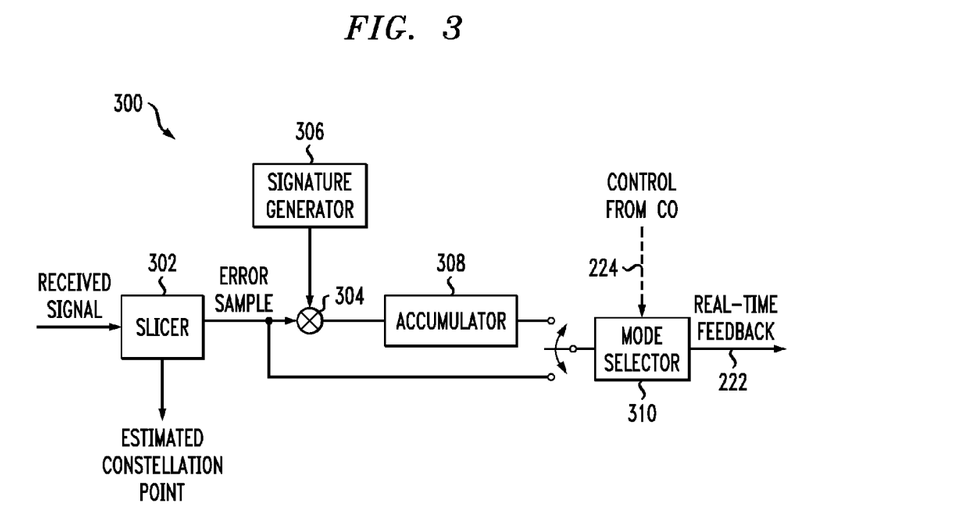
FIG. 3 illustrates CPE circuitry in an illustrative embodiment of the invention.

FIG. 3 shows an illustrative embodiment of CPE circuitry 300 that is implemented in each of the CPE 104 of the DSL system 100. This circuitry implements the above-described two-mode feedback mechanism. A slicer 302 receives a downstream data signal from the corresponding downstream signal path 220. The slicer, which may be viewed as an example of what is more generally referred to herein as a "receiver," maps the received signal to the nearest constellation point, and also outputs an error sample that is applied as one input to a multiplier 304. The other input of the multiplier is coupled to an output of a signature generator 306, which supplies a sequence of values of 1 or −1 to the multiplier in accordance with the joining signature sequence as generated within the CPE. Thus, each error sample is multiplied by a corresponding one of the values of the joining signature sequence. The results are added together in an accumulator 308. Thus, the CPE correlates the error samples measured during the superframe with the joining signature sequence.

The error samples generated by the slicer 302 may be viewed as an example of what is more generally referred to herein as an error signal. Such an error signal is typically generated as the difference between the received downstream data signal and an estimated transmitted data signal.

It should be noted that, in some embodiments, there may be particular tones on an active line for which no downstream signal is being sent, or for which the downstream signal is overwhelmed with noise. In this case, one might want to define the error signal to be just the received downstream signal. That is, the estimated transmitted data signal could be defined as zero, so that the error signal is equal to the received downstream signal.

At the end of a DMT superframe, a mode selector 310 selects either the output of the accumulator 308, or directly selects the error sample corresponding to the synchronization symbol position in the superframe. The output of the accumulator is selected if the CPE is in the joining mode, and the synchronization symbol position error sample is directly selected if the CPE is in the tracking mode. In either case, the selected value is sent back to the CO over the real-time feedback signal path 222. The CPE is configured into the joining mode or the tracking mode by controlling the mode selector 310 using a control signal supplied from the CO on the control signal path 224.

In the circuitry 300 of FIG. 3, complexity is reduced by using a single joining signature sequence for all of the CPE, and configuring the sequence to utilize only values 1 and −1. The CPE measures and stores error samples for each tone. In the joining mode, the CPE just needs to accumulate consecutive error samples with sign changes specified by the joining signature sequence. This requires storage for one complex coefficient per tone, and requires two additions per tone per DMT symbol.

The joining signature sequence could be specified explicitly in a given DSL standard, so that it could be built explicitly into the CPE. By way of example, the sequence could be specified as a pseudo-random sequence that could be generated as needed using shift registers rather than being stored.

It is to be appreciated that the circuitry 300 of FIG. 3 may be supplemented with additional circuitry typically found in conventional CPE.

Figure 4:
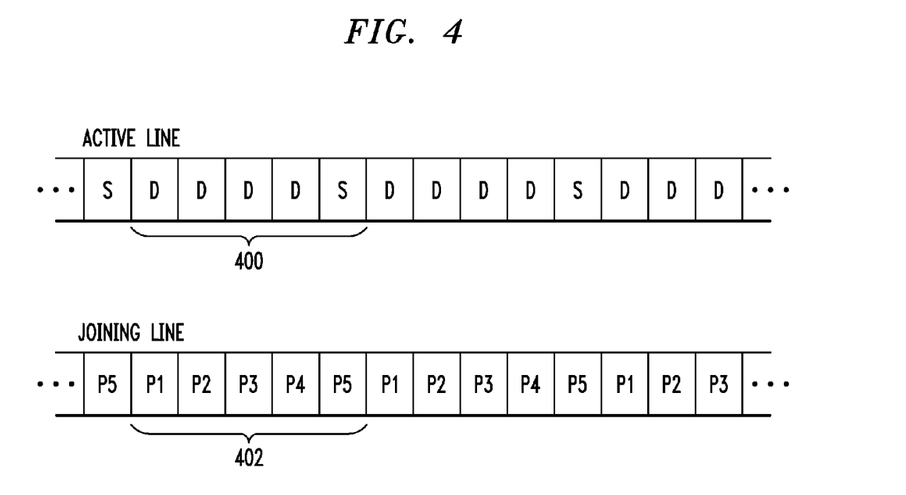
FIG. 4 shows exemplary signals that may be sent on downstream signal paths of respective active and joining DSL lines in the FIG. 1 system.

Referring now to FIG. 4, simplified examples of active line and joining line downstream signals are shown. A typical DMT superframe is generally 257 symbols long, comprising 256 data symbols followed by one synchronization symbol. For these simplified examples, it will be assumed that the superframe is instead five symbols long. On a given active line, as shown in the upper portion of the figure, a superframe 400 comprises four data (D) symbols followed by one synchronization (S) symbol. The superframe repeats in this manner within the downstream signal of the active line. On the joining line, a superframe 402 comprises a joining signature sequence that is of the same length as the superframe. More specifically, the joining signature sequence in this example comprises five symbols denoted P1 through P5, that replace the respective data and synchronization symbols of the typical active line superframe. The joining signature sequence repeats as shown. As will be described in greater detail below, the joining signature sequence is initially sent at a relatively low power level, for example, −35 dB relative to the power level of the weakest one of the active lines. The power is gradually ramped up for subsequent transmissions of the joining signature sequence, until it is transmitted at a designated full power level.

It should be noted that the joining signature sequence need not be the same length as the superframe. For example, in the case of a DMT superframe with 256 data symbols and one synchronization symbol, the joining signature sequence may utilize only the 256 data symbols and not the synchronization symbol. The joining signature sequence may alternatively include one or more synchronization symbols. Subsets of the data symbols of the superframe may also be used. It is also possible that data symbols from several superframes may be used for the joining signature sequence. Such arrangements may involve sequences that are longer than 256 symbols. For example, the accumulator 308 in the CPE circuitry of FIG. 3 may be permitted to run for two full superframes before resetting, with the joining signature sequence comprising 512 data symbols.

The following is a more detailed example of one set of process steps that may be used to join a line to a group of active lines in the DSL system 100 utilizing the two-mode feedback mechanism described above.

1. The joining line CPE 104-$i$ and the CO 102 exchange handshake information, indicating that the CPE should be initialized to join an active group.

2. The CO sends control signals to switch all active CPE into joining mode.

3. The joining signature sequence is transmitted over the downstream signal path 220-i of the joining line at a power level of −35 dB relative to the power level of the weakest active line. The joining signature sequence is repeated in subsequent superframes, as indicated generally in FIG. 4, for power continuity.

4. Once the CO has received the correlation results from a superframe in which the joining signature sequence was transmitted, it estimates the crosstalk from the joining line into the active lines and updates the precoder accordingly.

5. The transmit power level of the joining signature sequence is increased by a fixed amount (e.g., 10 dB or 15 dB).

6. Steps 4 and 5 are repeated until the transmit power level of the joining signature sequence has reached a designated full power level.

7. Any remaining initialization procedures for the joining line continue at the full power level until the joining line becomes an active line.

8. The CO sends control signals to configure all of the active lines, which now include the previous joining line, into the tracking mode.

9. Periodic adjustments are made to the precoder based on error samples sent back from the active lines in the tracking mode.

In the embodiments described above, the CPE 104 are configured to switch between two modes, namely, the joining mode in which the active line CPE perform correlation operations, and the tracking mode in which correlation operations are performed at the CO based on error samples returned by the active line CPE. Thus, a given active line CPE can be configured in either mode, responsive to one or more control signals sent from the CO.

Figure 5:
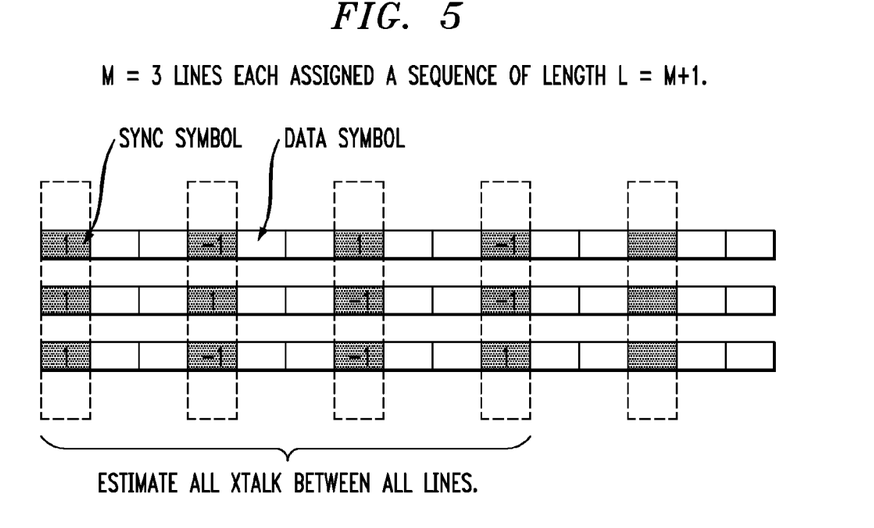
FIG. 5 illustrates downstream signals of active lines having their respective CPE configured in a tracking mode of operation.

FIG. 5 shows an example of one manner in which crosstalk estimation may be implemented in the above-noted tracking mode. In the tracking mode, estimation of crosstalk coefficients for downstream crosstalk cancellation is performed using error sample feedback from the CPE to the CO. The active lines within a synchronization group are synchronized with one another such that all lines transmit synchronization symbols at the same time. As indicated previously, error samples are measured on these synchronization symbols and returned to the CO after each synchronization symbol. This type of tracking arrangement is advantageous in that it does not require significant additional complexity in the CPE. Also, the bandwidth of error feedback is relatively low because error samples are fed back only for the synchronization symbols.

In the tracking mode, the crosstalk from each active line into all other active lines may be estimated. Each active line transmits a unique tracking signature sequence which includes one of two possible values, 1 or −1, in each synchronization symbol. When there are M active lines in the synchronization group, M mutually orthogonal sequences of 1 and −1 values are used, and the sequences are at least M symbols long. To avoid contamination by noise or interference with non-zero mean, it is desirable to leave out the constant sequence of all 1 values, so in general one needs sequences of length at least L=M+1 for a group of M active lines. In the example shown in FIG. 5, M=3 lines are each assigned a unique tracking signature sequence of length L=M+1=4. Thus, three orthogonal sequences of length four are used in this example to estimate crosstalk among three DSL lines. The number of data symbols between consecutive synchronization symbols in FIG. 5 is shown as two for simplicity and clarity of illustration, although as indicated previously a typical DMT superframe will include 256 data symbols between consecutive synchronization symbols. It is to be appreciated that other types of tracking arrangements may be used to estimate crosstalk between active lines in a given embodiment of the invention. The present invention does not require the use of any particular tracking or crosstalk estimation technique.

As mentioned previously, the power of the joining signature sequence can be ramped up in a small number of steps while keeping the risk of impacting the active lines below specified parameters. It will now be shown that even in the extreme case of strong crosstalk and a very low noise floor, it is possible to protect all active lines against full power signals from the joining line using measurements made during three superframes, with three updates of the precoder. Assuming 64 ms for each superframe measurement, and allowing 200 ms to communicate the measurement and update the precoder, the total time required to protect the active lines would be (64+200)×3~800 ms.

It will be assumed for purposes of the following analysis that crosstalk is estimated by sending a joining signature sequence of $L_j$ symbols on the joining line, and correlating the resulting error samples on an active line with the Hermitian conjugate of the sequence, and normalizing appropriately. Assuming complex Gaussian noise, the resulting estimate $g^*$ of the relative crosstalk coefficient g is complex Gaussian with variance $N/(PL_j)$, where P is the average power per symbol of the transmitted sequence, and where N is the relative noise power on the active line.

The crosstalk estimate is then used to update the precoder in an attempt to protect the active line. Taking a first order approximation for the precoder (which is generally valid if the relative crosstalk coefficients are much smaller than unity), the residual crosstalk coefficient after precoding will be approximately equal to the estimation error $(g^*-g)$. Since the magnitude squared of a complex Gaussian random variable with variance V is an exponential random variable with mean V, it follows that $|g^*-g|^2$ is exponential with mean $N/(PL_j)$. If the joining line transmits with power P' after precoding, it causes interference $|g^*-g|^2 P'$ on the victim line. The interference is exponentially distributed with mean $(N/L_j)(P'/P)$.

Thus, if we estimate the crosstalk from the joining line as described above, set the precoder according to the estimate, and then transmit at power P', the interference will be less than or equal to βN with probability $\exp(-\beta L_j P/P')$.

It is important to appreciate how much one can safely increase the power of the joining line after measuring the crosstalk during one superframe using CPE correlation. The risk of introducing excessive interference from the joining line can be specified in terms of the probability, say ε that the residual interference on a given tone exceeds a power βN. For example, setting β=1 requires the interference power to be no larger than the noise power. The requirement $$\exp(-\beta L_j P/P') \leq \epsilon$$

can be rearranged in the form $$P'/P \leq \beta L_j / \ln(1/\epsilon)$$

to bound the amount that the joining line power can safely be increased after estimation based on $L_j$ symbols. In an illustrative embodiment with $L_j$=256, it would be reasonable to choose β=1 and ε=$10^{-3}$. This would mean that, on average, the residual interference after precoding and increasing the power would exceed the noise power on at most one out of a thousand tones. In this case, the bound on the acceptable power increase P'/P works out to about 15 dB.

In the above-noted VDSL2 standard, the maximum achievable SNR is about 55 dB. Also, using standard worst case models, one can bound the level of relative crosstalk from the joining line into an active line. In most scenarios the relative crosstalk is weaker than −20 dB. Thus in the worst case, without precoding, a joining line may need to transmit at −35 dB relative to full power in order to avoid having a significant impact on an active line with 55 dB SNR. Each time that the crosstalk is estimated and the precoder updated, one can safely increase the power of the joining line by about 15 dB. Thus after at most three iterations of this process, the joining line can ramp up to full power.

In the embodiments described previously, only one joining line transmits the joining signature sequence during a given superframe. This is the typical scenario in which only one line joins at a time. However, in a situation where multiple lines need to join at once, the measurement and precoder update periods can be interleaved. That is, if ten lines are joining, the ten lines can transmit the joining signature sequence in respective ones often consecutive frames, and while a given one of the ten lines is transmitting the sequence in its assigned frame, the other joining lines transmit a constant sequence. This would be followed by an update of the entire precoder, and a second round of measurements, and so on. The total time required would be (10×64 ms+200 ms)×3∼2.5 seconds.

The above-described illustrative embodiments provide a number of significant advantages relative to conventional techniques. For example, the illustrative embodiments can provide fast, seamless joining of one or more additional DSL lines or other channels to a given set of active lines or other channels. The described techniques allow the precoder to adapt rapidly to the joining channel or channels, thereby limiting the adverse impact of the joining channel(s) on the existing active channels. Also, the joining process leverages periodic error feedback structure utilized for estimation of crosstalk between active lines, and thus does not significantly increase CPE complexity. Furthermore, the power of the joining line may be brought up in a small number of discrete steps in a seamless manner, with risks that can be explicitly controlled.

Any of a wide variety of known precoding techniques may be used to implement crosstalk cancellation for multiple joining and active lines of the type described herein. Such precoding techniques are well understood by those skilled in the art and therefore will not be further described.

Embodiments of the present invention may be implemented at least in part in the form of one or more software programs that are stored in a memory or other processor-readable medium of CO 102 or CPE 104 of system 100. Such programs may be retrieved and executed by a processor in the CO or CPE. The controller 200 may be viewed as an example of such a processor. Of course, numerous alternative arrangements of hardware, software or firmware in any combination may be utilized in implementing these and other systems elements in accordance with the invention.

It should again be emphasized that the embodiments described above are presented by way of illustrative example only. Other embodiments may use different communication system configurations, CO and CPE configurations, communication channels, joining and tracking sequence types, framing structures, and channel joining and tracking processes, depending on the needs of the particular communication application.

For example, although the illustrative embodiments utilize joining signature sequences that comprise 256 consecutive data symbols of a given DMT superframe, other types and arrangements of frame data symbols may be used for such sequences.

As another example, the particular manner in which correlation results or error samples are fed back from the CPE to the CO may be varied in other embodiments.

Also, it should be noted that power levels can be adapted on a per-tone basis, and that different signature sequences can be used for different tones.

Alternative embodiments may therefore utilize the joining techniques described herein in other contexts in which it is desirable to quickly obtain crosstalk coefficients for at least a subset of tones. In such alternative arrangements, the CO may, for example, designate a subset of tones to which signature sequences are applied. The CO can then readily determine crosstalk estimates based on feedback from the CPE.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of joining at least one channel to a group of active channels in a communication system, the method comprising the steps of:

transmitting control signals to configure respective customer premises equipment (CPE) of the active channels into a joining mode of operation;

transmitting a joining signature sequence to CPE of the joining channel over a downstream data signal path of the joining channel;

receiving from the CPE of the active channels respective correlation results;

estimating crosstalk from the joining channel into the active channels based on the correlation results;

configuring a precoder of the system based on the estimated crosstalk; and adding the joining channel to the group of active channels.

2. The method of claim 1 wherein a given one of the correlation results is generated in a corresponding one of the active channel CPE by correlating an error signal generated from a received downstream data signal with a copy of the joining signature sequence as generated in that CPE.

3. The method of claim 1 wherein the joining signature sequence is transmitted using a plurality of consecutive data symbols of a frame.

4. The method of claim 3 wherein the joining signature sequence comprises 256 consecutive data symbols of a discrete multi-tone (DMT) superframe.

5. The method of claim 1 wherein the step of transmitting a joining signature sequence further comprises repeatedly transmitting the sequence while the active channel CPE remain in the joining mode of operation.

6. The method of claim 1 wherein the step of transmitting a joining signature sequence further comprises the steps of:

transmitting the joining signature sequence at a first power level;

performing the receiving, estimating and configuring steps based on the joining signature sequence transmitted at the first power level;

transmitting the joining signature sequence at a second power level different than the first power level; and repeating the receiving, estimating and configuring steps based on the joining signature sequence transmitted at the second power level.

7. The method of claim 6 wherein the first power level is a power level of about −35 dB relative to a power level of a weakest one of the active channels.

8. The method of claim 6 further comprising the steps of:

further repeating the step of transmitting the joining signature sequence, using increasingly higher power levels for each such further repetition, until the joining signature sequence is transmitted at a designated full power level; and for each such further repetition, repeating the receiving, estimating and configuring steps based on the joining signature sequence transmitted at the corresponding one of the increasingly higher power levels.

9. The method of claim 1 wherein the step of transmitting the joining signature sequence further comprises setting power levels on a per-tone basis.

10. The method of claim 1 wherein the step of adding the joining channel to the group of active channels further comprises the steps of:

designating the joining channel as an added active channel of the group;

transmitting additional control signals to configure the active channel CPE into a tracking mode of operation;

while the active channel CPE are in the tracking mode of operation, transmitting data symbols and a tracking signature sequence to each of the active channel CPE over respective downstream data signal paths of the active channels;

receiving from each of the active channel CPE a plurality of error samples corresponding to respective symbols of the corresponding tracking signature sequence;

estimating crosstalk between the active channels based on the received error samples; and configuring the precoder of the system based on the estimated crosstalk.

11. The method of claim 10 wherein the tracking signature sequence associated with a given one of the active channels is transmitted in synchronization symbol positions of a frame utilized to transmit the data symbols on the downstream signal path of the given active channel.

12. The method of claim 1 wherein the joining signature sequence is transmitted for only a single joining line within a given frame.

13. The method of claim 1 wherein the joining signature sequence is transmitted for multiple joining lines in respective ones of multiple consecutive frames while the active channel CPE are in the joining mode of operation.

14. An apparatus comprising:

an access node adapted for communication over a plurality of channels with respective customer premises equipment (CPE) of said channels;

the access node comprising a precoder;

wherein the access node is operative to join at least one of the channels to a group of active other ones of the channels;

the access node being operative to transmit control signals to configure respective CPE of the active channels into a joining mode of operation; to transmit a joining signature sequence to CPE of the joining channel over a downstream data signal path of the joining channel; to receive from the CPE of the active channels respective correlation results; to estimate crosstalk from the joining channel into the active channels based on the correlation results; to configure the precoder based on the estimated crosstalk; and to add the joining channel to the group of active channels.

15. The apparatus of claim 14 wherein the access node comprises a central office of a DSL system.

16. The apparatus of claim 14 wherein the plurality of channels comprise respective subscriber lines of a DSL system.

17. An apparatus comprising:

customer premises equipment (CPE) configurable for operation in at least a joining mode of operation and a tracking mode of operation responsive to at least one control signal received from an access node;

wherein in the joining mode of operation the CPE is configured to generate at least one correlation result and to send the correlation result to the access node;

wherein in the tracking mode of operation the CPE is configured to generate at least one error sample and to send the error sample to the access node;

wherein when the CPE is in the joining mode of operation, another CPE associated with a joining channel to be added to a group of active channels is configured to receive a joining signature sequence from the access node over its associated joining channel; and wherein the correlation result is utilizable by the access node to estimate crosstalk from the joining channel into one of the active channels and the estimated crosstalk is utilizable by the access node to configure a precoder.

18. The apparatus of claim 17 wherein the CPE comprises:

a receiver adapted to process a received signal and to generate a plurality of error samples;

a sequence generator;

a multiplier having first and second inputs coupled to respective outputs of the receiver and the sequence generator and operative to multiply the error samples with respective values of a joining signature sequence supplied by the sequence generator in the joining mode of operation;

an accumulator having an input coupled to an output of the multiplier and configured to generate the correlation result by accumulating outputs of the multiplier over a designated period; and a mode selector responsive to the control signal from the access node for selecting an output of the accumulator for delivery to the access node in the joining mode of operation and for selecting said at least one error sample for delivery to the access node in the tracking mode of operation.

19. The apparatus of claim 17 wherein the correlation result is generated by correlating an error signal generated from a received downstream data signal with a copy of the joining signature sequence.

20. The apparatus of claim 17 wherein the CPE comprises a modem.

* * * * *